US00RE39709E

(19) United States
(12) Reissued Patent
Fekete et al.

(10) Patent Number: US RE39,709 E
(45) Date of Reissued Patent: *Jul. 3, 2007

(54) MULTIAXIAL PIN SEAMED PAPERMAKER'S PRESS FELT

(75) Inventors: Eugene Z. Fekete, Dunwoody, GA (US); Edwin R. Perry, Vancouver, WA (US); Robert P. Burke, Berkeley Lake, GA (US)

(73) Assignee: AstenJohnson, Inc., Kanata, Ontario (CA)

( * ) Notice: This patent is subject to a terminal disclaimer.

(21) Appl. No.: 10/922,149

(22) Filed: Aug. 20, 2004

Related U.S. Patent Documents

Reissue of:
(64) Patent No.: 5,785,818
Issued: Jul. 28, 1998
Appl. No.: 08/885,750
Filed: Jun. 30, 1997

U.S. Applications:
(63) Continuation-in-part of application No. 08/805,202, filed on Feb. 27, 1997, now abandoned.

(51) Int. Cl.
*D21F 7/10* (2006.01)

(52) U.S. Cl. ..... 162/358.2; 162/900; 162/904; 139/283 AA; 442/240; 442/247; 428/58

(58) Field of Classification Search ..... 162/358.1, 162/358.2, 900, 904, 273; 139/383 A, 383 AA; 428/58, 60; 442/240, 247
See application file for complete search history.

(56) References Cited

U.S. PATENT DOCUMENTS

| | | | | | |
|---|---|---|---|---|---|
| 3,086,276 | A | * | 4/1963 | Bartz et al. | 428/109 |
| 3,657,068 | A | * | 4/1972 | Ivanowicz | 162/358.2 |
| 4,186,780 | A | * | 2/1980 | Josef et al. | 139/383 AA |
| 4,418,726 | A | * | 12/1983 | Josef et al. | 139/383 AA |
| 4,601,785 | A | * | 7/1986 | Lilja et al. | 162/199 |
| 4,698,250 | A | * | 10/1987 | Talonen et al. | 428/58 |
| 4,755,260 | A | * | 7/1988 | Sakuma | 162/199 |
| 4,842,925 | A | * | 6/1989 | Dufour et al. | 428/223 |
| 5,110,672 | A | * | 5/1992 | Zehle et al. | 442/240 |
| 5,268,076 | A | * | 12/1993 | Best et al. | 162/358.2 |
| 5,360,656 | A | * | 11/1994 | Rexfelt et al. | 428/193 |

* cited by examiner

*Primary Examiner*—Eric Hug
(74) *Attorney, Agent, or Firm*—Shapiro Cohen

(57) ABSTRACT

A multilayer papermaker's press felt fabric comprising in combination a woven first fabric layer, typically a double layer fabric, has a cross machine direction pin seam. A second fabric layer is located on the paper side face of the first fabric layer, and a layer of needled batt is applied to the paper side face of the second layer binding the layers together. A flap comprising a short length of the second fabric layer with attached batt overlays the pin seam area in the first layer. The second layer comprises a plurality of relatively narrow strips, which are located with a lateral edge at a first cant angle of from more than 1° to less than 20° to the machine direction. A third layer, similar to the second layer, can be included on the machine side of the first layer; the strip widths, the cant angles, and the direction of the cant angle relative to the machine direction for each of the two strips need not be the same. The fabric is assembled using a spiral winding technique.

24 Claims, 2 Drawing Sheets

MULTIAXIAL PIN SEAMED PAPERMAKER'S PRESS FELT

Matter enclosed in heavy brackets [ ] appears in the original patent but forms no part of this reissue specification; matter printed in italics indicates the additions made by reissue.

This application is a cip of U.S. Pat. No. 08/805,202 filed Feb. 27, 1997, now abandoned.

BACKGROUND TO THE INVENTION

This invention relates to press felts, which are used in the press section of a paper making machine. In this part of the papermaking machine, the paper web, which may contain up to about 85% water, is passed between pairs of opposed rolls so that a large proportion of this water is literally squeezed out of the wet paper web. In this process, the wet paper web is supported by at least one, or conveyed between two opposed fabrics known as press felts. These press felts are generally constructed with a fabric base structure, which has layers of batt needled to at least one, and generally to both, of its surfaces. Several fabric constructions are used for the base fabric structure, including both single layer and double layer woven fabrics, and the fabrics can be woven either flat as a continuous run, or endless as a closed loop. Endless felts require that the press section be opened up to allow their installation. Seamed felts are open ended for installation and the ends are subsequently joined by seaming, for example with a pin seam, on the press section. In either case, in order to be able to install the finished fabric into a press section, it is often advantageous to make provision for a seam that can be closed during installation in the press section.

The seam is the most difficult part of the press fabric to make. For although it is relatively straight forward to create a press felt which will provide the required properties of adequate strength, adequate drainage, and lack of fabric marking, whether or not it can be used depends upon also being able to provide a seam in the fabric which has an adequate life in service, provides the required strength, provides the required drainage, and most importantly does not cause marking of the paper.

The most commonly used seam in press felts is a pin seam, in which monofilament yarns from each of the two ends of the fabric which are to be joined are woven back into the fabric ends to provide a set of small loops. The two fabric ends are joined by interdigitating the two sets of loops, and inserting a pintle across the width of the fabric. This form of seam is most often used in press felts based on double layer woven fabrics. Examples of such seams are shown in EP 0 294 951, U.S. Pat. No. 4,842,925 and U.S. Pat. No. 4,601,785.

These conventional press felts offer the benefits of ease of installation, and ease of seam assembly on the machine. But they have the disadvantages of being limited to applications which can tolerate at least some marking of the paper by the seam, and where the drainage requirements are modest. A further disadvantage is that the applied batt wears more rapidly in the seam area. An area of worn batt cover over the seam area increases the danger of marking, and also accelerates even more the rate of wear in the seam area. This leads to premature press felt failure due to either paper marking problems, or mechanical seam failure, or both.

Several proposals have been made to overcome these difficulties.

One that has been made is to use two woven fabric layers, rather than one, to provide what may be termed a laminated base structure. Fabrics of this type are shown in U.S. Pat. No. 3,086,276, wherein the fabric layers are disposed in a bias relationship, and in U.S. Pat. No. 3,657,068 in which a relatively fine and a relatively coarse fabric are disposed on each side of a layer of batt. An alternative fabric is shown in U.S. Pat. No. 5,110,672. In these references, the layers are laminated together by the batt which in the needling application process is forced into engagement with all of the layers. A problem common to all of these structures is that the cut fabric ends adjacent the seam tend to unravel, thus leaving the batt more or less unsupported in the most important area of the fabric. This leads to marking of the paper, and to premature seam failure.

Alternatively, it has been proposed to use a laminate structure, examples of which are described in U.S. Pat. No. 4,186780 and in U.S. Pat. No. 4,418,726, and to pin seam each of the fabrics in the laminate. Apart from the fact that this does not eliminate any of the difficulties attendant on a single pin seam, it further complicates installation, as there are now two seams to be closed, not one. Such an installation step is difficult, time consuming and defeats the original purpose of the seam, which is to provide ease of installation.

Another proposal is to provide what may be termed a "flap" of batt, which may be reinforced with a portion of the fabric base, that will overlay a conventional pin seam, preferably on the paper side of the fabric. Examples of this are described in CA 1,303,833 and EP 0 294 951 mentioned above. In each of these, in constructing the pin seam, a short flap of batt is provided which is attached to one of the ends to be joined and which is intended to cover the joint after the pin seam has been assembled. In U.S. Pat. No. 4,601,785 it is recommended to attach the batt flap by gluing or needling. In U.S. Pat. No. 4,842,925 it is recommended to use brittle or soluble yarns adjacent the seam. Either during or following the needling step to attach the batt these yarns are removed thus allowing the batt flap to be cut and placed in position. In EP 0 294 951 it is recommended to use an additional layer of machine direction yarns in the base fabric to reinforce the batt flap. Seams such as these are also difficult to assemble, and suffer from the disadvantage that the fabric in the flap supporting the batt also ends to unravel, thus leaving the batt unsupported which results in marking of the paper.

SUMMARY OF THE INVENTION

This invention seeks to provide an alternative solution to these problems. A press felt is provided in which a laminate fabric is used as the base fabric, only the first layer of which is joined end-to-end by a pin seam. The second layer is cut to provide a batt carrying flap over the pin seam. The second layer is also canted with respect to the first layer, so that the cut seam is at an angle with respect particularly to the fabric wefts, thus inhibiting the loss of these yarns due to the fabric unravelling. The second fabric is also made in relatively narrow strips, thus further diminishing the possibilities of unravelling.

Thus in a first embodiment this invention seeks to provide a multilayer papermaker's press felt fabric comprising in combination:

- a woven first fabric layer incorporating therein a cross machine direction pin seam,
- a second fabric layer on the paper side face of the first fabric layer,
- a layer of needled batt applied to the paper side face of the second layer which penetrates into the first fabric layer thereby binding the first and second layer together, and a flap comprising a short length of the second fabric layer with attached batt overlaying the pin seam in the first layer, wherein:

(a) the second layer comprises a plurality of relatively narrow strips, and (b) the strips of the second layer are located with a lateral edge at a first cant angle to the machine direction, and (c) the first cant angle has a value of from more than 1° to less than 20°.

In a second the fabric further includes a third layer on the machine side of the first layer wherein:

(a) the third layer comprises a plurality of relatively narrow strips, and (b) the strips of the third layer are located with a lateral edge at a second cant angle to the machine direction, and (c) the second cast angle has a value of from more than 1° to less than 20°.

BRIEF DESCRIPTION OF THE DRAWINGS

The invention will now be described in one embodiment by way of reference to the drawings, in which.

DESCRIPTION OF THE PREFERRED EMBODIMENTS

In this invention the following terms are of importance:

"machine direction" refers to a direction taken along the length of the press section, which is substantially parallel to the direction in which the press felt moves, and the associated term "cross machine direction" refers to a direction substantially at a right angle to the machine direction;

"paper side" refers to the side of a press felt, or of the basic woven structure, that is towards the paper when the press felt is installed, and the related term "machine side" refers to the side of the press felt, or of the basic woven structure, that is toward the press section rolls when the press felt is installed; and "cant angle" refers to an angle between a lateral edge of a fabric forming part of the basic woven structure and the machine direction.

Figure 1:
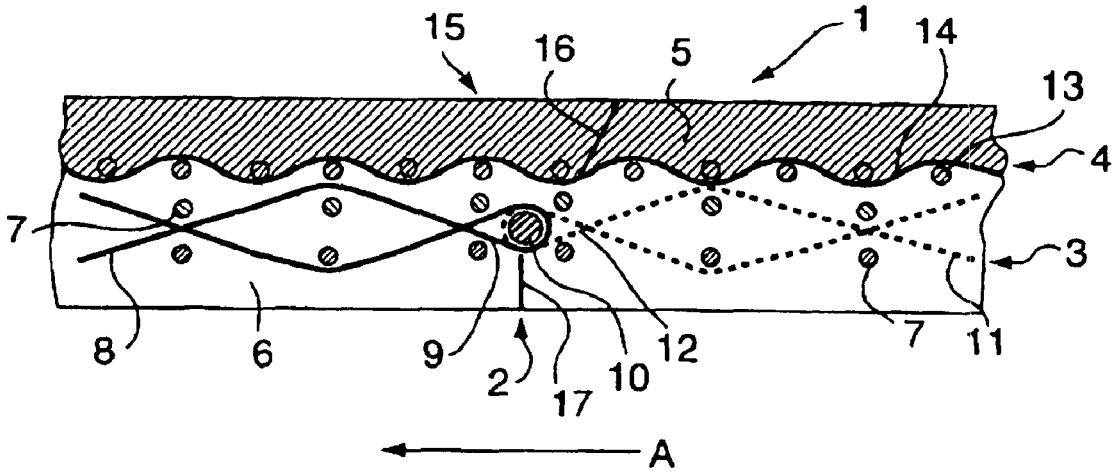
FIG. 1 is a section perpendicular to the plane of a press felt through a pin seam.

Referring first to FIG. 1, the part section shown is taken along the machine direction. The press felt shown generally at 1 is composed of essentially three layers, to which a fourth can be added, and which includes a seam as shown generally at 2. The supporting base fabric comprises a first machine side fabric 3 which includes the seam 2. Overlaying the paper side of this first layer 3 is a second layer 4; these layers are held together by the applied batt 5 which penetrates through the second layer 4 to some extent into the first layer 3. If desired, a further layer of batt can be applied to the machine side of the first layer 2 as shown ghosted at 6. The first layer, which as shown is a relatively simple double layer weave, that includes wefts 7 in the cross machine direction, and warps 8 and 11 in the machine direction. The pin seam is formed by weaving back lengths of the warps 8 and 11 respectively to provide the loops 9 and 12 respectively. The seam is held together by the pintle 10 inserted into the loops 9 and 11. This form of seam construction is well known.

The upper second fabric on the paper side of the first is a relatively thinner fabric and as shown comprises a simple weave with wefts 13 and warps 14. The manner of construction of this fabric layer is described below. In the region of the seam 2 both the second fabric 4, and the batt 5 are cut at the line 16 (the batt 6 if used is also cut at the line 17) to provide a flap 15. In use, the press felt moves in the direction A, so that the flap 15 is downstream from the line of the seam pintle 10.

Figure 2:
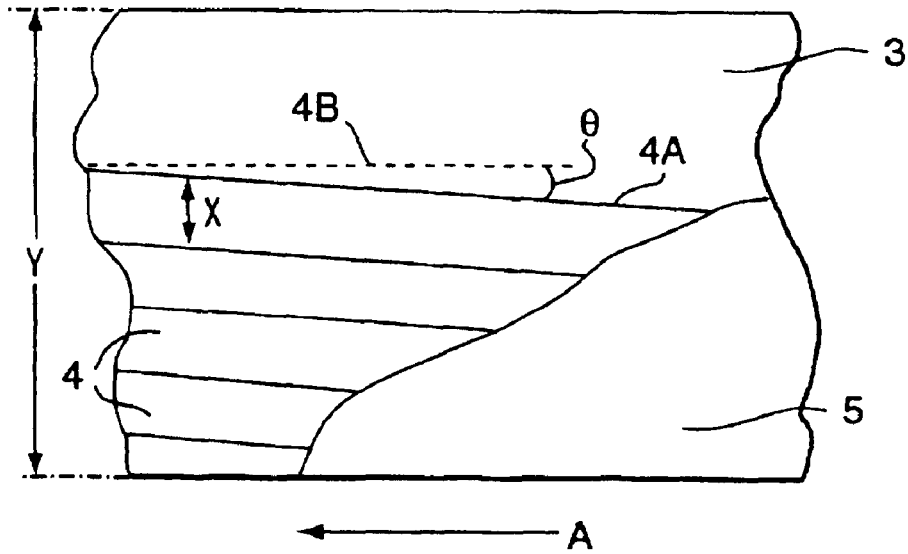
FIG. 2 is a partly sectioned paper side view of a press felt.

In FIG. 2 is shown a part sectioned view of the paper side layer face of the fabric in FIG. 1. The paper side face proper is the layer of batt 5. The batt layer 5 overlays the second fabric 4, which is located on the paper side of the first layer 3. The first layer 3 is woven to be the full width of the press felt, whilst the second layer is woven as a much narrower strip, so that the two distances X and Y both of which are more or less in the cross machine direction are different, with Y being larger than X. The narrower second layer is also applied over the first with a lateral edge 4A at a cant angle θ to the machine direction indicated at 4B, which is also substantially parallel to the edge of the press felt. The second layer is applied using essentially the techniques described by Best et al. in U.S. Pat. No. 5,268,076 and by Rexfelt et al. in U.S. Pat. No. 5,360,656, the disclosures of which are incorporated herein by reference.

The fabric of FIG. 2 is assembled as follows. As the first step the first layer of fabric is woven to a suitable double layer design based on the conditions obtaining in the press section in which the press felt is to be used. It can be woven flat, or woven as a continuous run, which latter is preferred. A suitable length of this fabric is then taken and the pin seam 2 created in it to provide a continuous seamed loop 3 of the required length. The second layer 4 is then wound onto the first with a lateral edge 4A at the desired cant angle θ to the machine direction 4B, using essentially the techniques described by Best et al. in U.S. Pat. No. 5,268,076 and by Rexfelt et al. in U.S. Pat. No. 5,360,656. The paper side batt layer 5 is then applied either using conventional techniques, or to obtain a desired batt orientation using the method described by Kroma et al., in a paper titled "Perpendicular Laid Bulky Nonwovens", 7th World Conference of The Textile Institute, Atlanta, Ga., USA, September 1994, which is incorporated herein by reference. After the batt has been applied, the batt 5 and the second fabric layer 4 are both cut at 16 on the correct downstream side of the line of the pintle so that the seam can be separated to allow installation into the press section, and to provide the flap 15.

Figure 3:
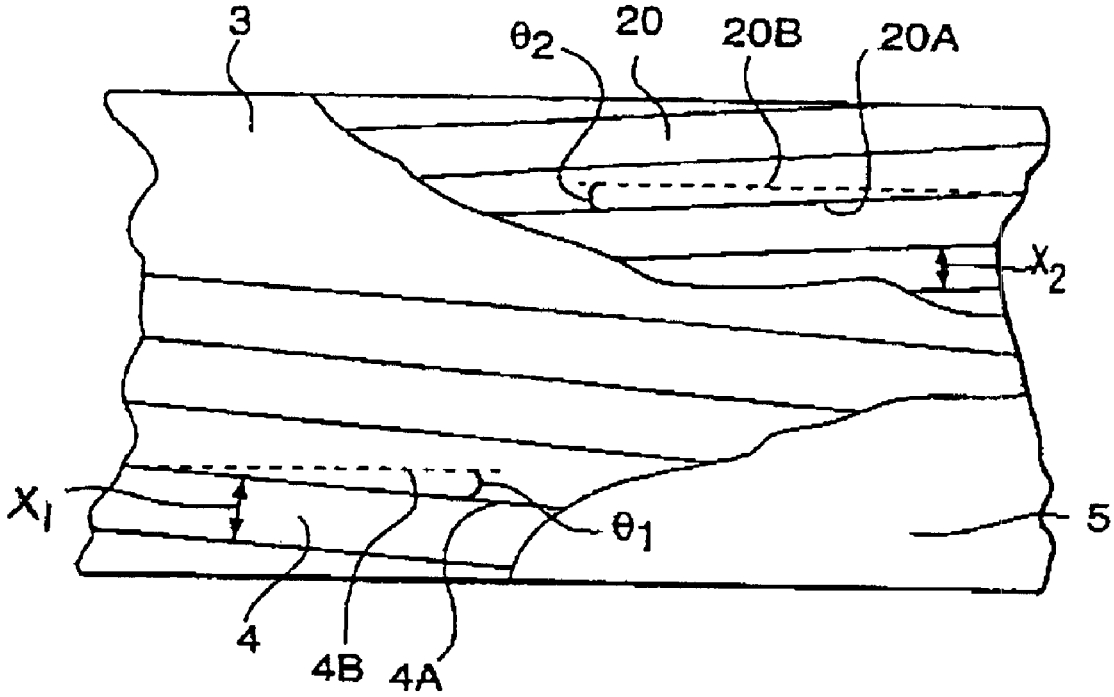
FIG. 3 is a partly sectioned paper side view of an alternative press felt.

An alternative fabric is shown in FIG. 3. This fabric is similar to that shown in FIGS. 1 and 2, and is constructed by the same techniques. The fabric as shown has a paper side batt layer 5, and beneath it a second layer 4 which is wound onto a first layer 3. In addition, a third layer 20 of the same general type as the second layer 4 is also provided on the machine side of the first layer 3. The widths $X_1$ and $X_2$ of the strips used in the [first] *second* and third layers 4 and 20 need not be the same. However these two widths desirably should be chosen to avoid a circumstance where a line of edge contact in the second layer is aligned with and directly above a line of edge contact in the third layer, because any gap in the edge contact in either layer could cause marking of the paper. The second layer 4 is wound at a first cant angle $\theta_1$, between the lateral edge 4A and the machine direction indicated at 4B, and the third layer 20 is wound at a cant angle $\theta_2$ between the lateral edge 20A and the machine direction indicated at 20B. The first and second cant angles need not be the same, and need not be in the same sense relative to the machine direction.

The importance of the combination of using a relatively narrow strip for the second layer, or for the second and third layers, which has a lateral edge at a cant angle θ to the machine direction is that when the second fabric is cut to open the seam at any given point there is only a short length of second, and, when used, third, fabric yarn which can unravel when the press fabric is in use. The amount which can unravel is limited by the width X of the narrow strip of the layer, and the value of the cant angle θ.

In experimental fabrics it has been found that cant angles as low as 1.7° (which corresponds to an angle of 3 cm per meter) can be used successfully, up to a maximum angle of about 20° above which the risk of unraveling again appears to become a problem. It appears that a cant angle of less than about 10° is desirable.

The relative widths of the first layer and the strips used for the second and third layers, as appropriate, is at least in part determined by the width of the press section. The strips have to be of adequate width to be woven, and should be significantly narrower than the first layer, since if they are made too wide the amount of yarn that can unravel increases. It appears that a ratio of at least 2:1 is desirable. However for a wide press section it is not possible to maintain such a low ratio, and ratios up to at least about 20:1 appear to be useable. It is also possible to use different width strips when both a second and a third layer are used.

The choice of fabric weave used for each of the layers is open to considerable flexibility, and will mainly be determined by the proposed conditions of use. As a generality, the first layer should be a double layer fabric, mainly to facilitate construction of the pin seam. The second, and where used, third, layer is generally a single layer fabric, and is preferably a different weave in terms of yarns count/cm than the first layer. It can be either a finer weave or a coarser weave, and in some applications a second, or third, layer that is a double layer fabric might be used. The second and third layer fabrics also need not be the same. Furthermore, these fabrics need not be woven ones, and a knitted fabric strip can be used in certain applications.

The embodiments of the invention in which an exclusive property or privilege is claimed are defined as follows:

1. A multilayer papermaker's press felt fabric comprising in combination:

a woven first fabric layer incorporating therein a cross machine direction pin seam, a second fabric layer on the paper side face of the first fabric layer, a layer of needled batt applied to the paper side face of the second layer which penetrates into the first fabric layer thereby binding the first and second layer together, and a flap comprising a short length of the second fabric layer with attached batt overlaying the pin seam in the first layer, wherein:

(a) the second layer comprises a plurality of relatively narrow strips, and (b) the strips of the second layer are located with a lateral edge at a first cant angle to the machine direction, and (c) the first cant angle has a value of from more than 1° to less than 20°.

2. A fabric according to claim 1 further including a third layer on the machine side of the first layer wherein:

(a) the third layer comprises a plurality or relatively narrow strips, and (b) the strips of the third layer are located with a lateral edge at a second cant angle to the machine direction, and (c) the second cant angle has a value of from more than 1° to less than 20°.

3. A fabric according to claim 1 wherein the first cant angle has a value of from more than 1° to less than 10°.

4. A fabric according to claim 2 wherein the first cant angle for the second fabric layer has a value of from more than 1° to less than 10°.

5. A fabric according to claim 1 wherein the second cant angle for the third fabric layer has a value of from more than 1° to less than 10°.

6. A fabric according to claim 2 wherein the cant angles of the second and third fabric layers are the same.

7. A fabric according to claim 2 wherein the cant angles of the second and third fabric layers are not the same.

8. A fabric according to claim 2 wherein the cant angles of the second and third fabric layers are in the same sense relative to the machine direction.

9. A fabric according to claim 2 wherein the cant angles of the second and third fabric layers are not in the same sense relative to the machine direction.

10. A fabric according to claim 1 wherein the ratio of the widths of the first [and second layers] *layer and the strips of the second layer* is at least 2:1.

11. A fabric according to claim 2 wherein the ratio of the widths of the first [and second layers] *layer and the strips of the second layer* is at least 2:1.

12. A fabric according to claim 2 wherein the ratio of the widths of the first [and third layers] *layer and the strips of the third layer* is at least 2:1.

13. A fabric according to claim 2 wherein the widths of the second and third layers are the same.

14. A fabric according to claim 2 wherein the widths of the second and third layers are not the same.

15. A fabric according to claim 1 wherein the batt is oriented in a desired direction.

16. A fabric according to claim 1 wherein the second fabric layer is of woven or knitted construction.

17. A fabric according to claim 2 wherein the batt is oriented in a desired direction.

18. A fabric according to claim 2 wherein the second fabric layer is of woven or knitted construction.

19. A fabric according to claim 2 wherein the third fabric layer is of woven or knitted construction.

20. A fabric according to claim 1 wherein the first layer is woven as a double layer fabric.

21. A fabric according to claim 2 wherein the first layer is woven as a double layer fabric.

22. A fabric according to claim 1 wherein the ratio of the widths of the first [and second layers] *layer and the strips of the second layer* is from at least 2:1 to 20:1.

23. A fabric according to claim 2 wherein the ratio of the widths of the first [and second layers] *layer and the strips of the second layer* is from at least 2:1 to 20:1.

24. A fabric according to claim 2 wherein the ratio of the widths of the first [and third layers] *layer and the strips of the third layer* is from at least 2:1 to 20:1.

* * * * *